United States Patent
Yoshimura et al.

Patent Number: 5,295,134
Date of Patent: Mar. 15, 1994

[54] IN-SERVICE ACTIVATOR FOR A BROADBAND EXCHANGER

[75] Inventors: Shuji Yoshimura; Satoshi Kakuma; Shiro Uriu; Naoyuki Izawa, all of Kawasaki, Japan

[73] Assignee: Fujitsu Limited, Kawasaki, Japan

[21] Appl. No.: 853,257

[22] Filed: Mar. 18, 1992

[30] Foreign Application Priority Data

Mar. 19, 1991 [JP] Japan .................. 3-055110

[51] Int. Cl.⁵ ........................... H04L 12/26
[52] U.S. Cl. ........................ 370/16; 340/827; 370/60
[58] Field of Search ........ 370/16, 53, 60, 60.1; 455/8; 375/40; 340/825.01, 827; 371/8.2

[56] References Cited

U.S. PATENT DOCUMENTS 4,985,904 1/1991 Ogawara ..................... 455/8
5,153,578 10/1992 Izawa et al. ................. 370/60.1

Primary Examiner—Benedict V. Safourek
Attorney, Agent, or Firm—Staas & Halsey

[57] ABSTRACT

An in-service activator for a broadband exchanger has a dual system structure, in which a first system and a second system form a dual pair. The first system and the second system in the dual pair each has at least one [1] channel converter and a switcher. A channel converter stores channel setting information for use in routing a cell inputted from a line, and outputs the cell inputted from the line by attaching the channel setting information to the cell. The switcher switches a cell outputted from a channel converter. The interfacer stores, in a channel converter of a to-be-activated standby system in the dual pair, the channel setting information read from the corresponding channel converter of an act system in the duplex pair.

12 Claims, 7 Drawing Sheets

IN-SERVICE ACTIVATOR FOR A BROADBAND EXCHANGER

BACKGROUND OF THE INVENTION

1. Field of the Invention

This invention pertains to an in-service activator for booting up switchers in a standby system of a broadband exchanger having a dual system structure.

2. Description of the Related Arts

With recent wide-spread use of data communications, public lines have been carrying not only traditional voice messages but also other vital data in general, communication networks of the future must provide even more accurate transmissions and higher-quality exchanges.

A broadband ISDN (B-ISDN) has been realized as a communication network capable of handling high speed data transferred at a rate in the range of one hundred fifty mega bits per second [150 Mbps] to six hundred mega bits per second [600 Mbps], and various interfaces are being standardized. The CCITT has studied an asynchronous transfer mode (ATM) transmission system.

For instance, a broadband exchanger of an ATM transmission system transmits and exchanges data transported in different bands by splitting them into pieces (called cells) of information having a fixed length of a few tens of bytes. A cell has a header for storing information such as a virtual channel identifier (VCI) which provides information to a subscriber on the receiving side. Hardware of an ATM switcher transmits and exchanges cells to a subscriber which receives the cells at a high speed by using a header. This enables transmission paths to be utilized efficiently by flexibly performing a service requiring different transmission speeds.

In the above described switching operation, the processor of an ATM exchanger designates a memory buffer of a switcher in the switching module in which each cell is to be laid up. Because a cell flows autonomously in the network, this arrangement of a cell switching operation is called self-routing. A subscriber extracts necessary cells by their VCIs from an ATM highway and restores payload data (user-originated information) by eliminating their headers.

FIG. 1 is a block diagram of a communications route in an ATM exchanger.

Each of trunks 2 accommodates a corresponding one of subscriber lines 1 on the input side. A virtual channel controller (VCC) 5 receives outputs from the trunks 2. Based on the call control information from the processor of the ATM exchanger, the VCC 5 reattaches VCIs in the headers of cells supplied from subscriber lines 1 through the trunks 2 by changing them from the ones giving information on their current destinations, i.e. current output nodes (ATM switcher), to the ones giving information on their next destinations, i.e. next output nodes (ATM switcher), and attaches at the head ends of those cells tags giving information on the switching paths within a multistage self-routing module (MSSR) 6 to target output highways 8. A plurality of multiplexer (MUXs) 3 partially multiplex outputs from the VCC 5. Input highways 4 carry corresponding outputs from the MUXs 3.

The MSSR 6 forming substantive communications paths receives outputs from the MUXs 3 through input highways 4.

The MSSR 6 outputs cells through output highways 8 to corresponding demultiplexers (DMUXs) 9, which demultiplex them for outputs through corresponding trunks 7 to subscriber lines 1' on the output side.

As described earlier, a broadband exchanger such as an ATM exchanger must be highly reliable. This is because the transmission capacity of such an exchanger is so large, that its failure may paralyze all the connected systems.

Hence, a broadband exchanger has a dual system structure for meeting the high reliability requirement. One [1] system in the dual system structure ordinarily calls the other system in the same dual system structure a mate system. A system in active use called an active system is backed up by a system in reserve called a standby system in a dual system structure. Thus, usually, the standby system is the mate system for the active system, and the active system is the mate system for the standby system.

A processing by an active system to put the mate system from an out-of-service [OUS] status (standing-by as a backup with no paths set in its switchers) to an in-service [INS] status (actually performing services) is called an INS processing.

When the active system in such a duplex structure system cannot continue its service for one reason (e.g. a breakdown) or another, the INS processing is executed to boot up its mate system, i.e. the standby system, to an in-service status. The INS processing must be executed as fast as possible to minimize a temporary system suspension.

Because a failure occurring in a standby system cannot be detected at all times, its normality is monitored by intermittent checkups.

That is, for confirming each of the two [2] systems (system #0 and system #1) of a broadband exchanger having a dual system structure is normal, a central controller regularly checks them with a diagnostic program. If system #0 is in active use backed up by system #1 in reserve, the central controller diagnoses system #1 in reserve by booting it up from the out-of-service status to the in-service status.

An INS processing system is sought after for promptly performing an INS processing without an increase in load on the central controller.

FIG. 2 is a block diagram of a broadband exchanger pursuant to a prior art example.

A broadband exchanger 100A has a dual system structure. Channel converters 10a, . . . and 10b and 11a, . . . and 11b give channel setting information for routing cells inputted from lines and comprise tables for storing channel setting information. Switchers 20 and 21 form paths designated by channel setting information set by the channel converters 10a, . . . and 10b and 11a, . . . and 11b. Central controllers 30 and 31 execute switching processes. Switch accessors 40 and 41 exchange control information between the channel converters 10a, . . . and 10b and 11a, . . . and 11b and the central controllers 30 and 31. The parts numbered zero [0] at the least significant bit are for system #0 in active use and the parts numbered one [1] at the least significant bit are for system #1 in reserve.

Switcher 20 is in an in-service status and switcher 21 is in an out-of-service status. The system currently in use is called an active system.

Central controller 30 sets to switcher 21 the same paths as those set in switcher 20 by sending commands to channel converters 11a, . . . and 11b and boots up switcher 21 from an out-of-service status to an in-service status, thereby setting the same paths as the active system. This allows the same processings, such as failure supervisions.

According to the prior art example shown in FIG. 2, the channel setting information written in the head end of a cell inputted from a line is analyzed for setting the necessary paths in switcher 20. The channel setting information is stored in the tables of channel converters 10a, ... and 10b.

That is, the tables of channel converters 10a, ... and 10b of system #0 in active use (i.e. the act system) respectively store paths, i.e. arteries, within switcher 20. The tables of channel converters 11a, ... and 11b of system #1 in reserve (i.e. the standby system) store the same contents of the tables of channel converters 10a, ... and 10b of system #0 in active use. This enables the standby system, which is the mate system of the active system, to operate in the same manner as the active system.

When the earlier described INS processing is performed, the contents in the tables of channel converters 10a, ... and 10b of system #0 in active use are copied to the tables of channel converters 11a, ... and 11b of system #1 in reserve. Then, switcher 21 sets paths for switching cells pursuant to the contents of the tables of channel converters 11a, ... and 11b.

Therefore, to boot up switcher 21 from an out-of-service status to an in-service status, central controller 30 sends to switch accessor 41 commands for setting the same number of paths as that of the paths set in switcher 20 of system #0 in active use.

Therefore, the larger the size of a conventional exchanger, the more time it takes for software processing. This not only lowers the throughput of central controller 30 for other processings but also requires a large amount of time for an INS processing itself.

SUMMARY OF THE INVENTION

This invention pertains to an in-service (INS) activator for booting up switchers in a standby system of a broadband exchanger having a dual system structure.

It purports to reduce a software load on a central controller and to quickly execute an INS processing for activating the standby system.

It configures an in-service activator for a broadband exchanger having a dual system structure, in which a first system and a second system form a dual pair. The first system and the second system in the dual pair each has at least one [1] channel converter and a switcher. A channel converter stores channel setting information for use in routing a cell inputted from a line, and outputs the cell inputted from the line by attaching the channel setting information to the cell. The switcher switches a cell outputted from a channel converter.

The interfacer stores, in a channel converter of a to-be-activated standby system in the dual pair, the channel setting information read from the corresponding channel converter of an active system in the dual pair.

BRIEF DESCRIPTION OF THE DRAWINGS

Those skilled in the art can easily understand additional features and objects of this invention from the description of the preferred embodiments and the illustration of the attached drawings.

In the drawings.

DESCRIPTION OF THE PREFERRED EMBODIMENTS

Explanation of the Underlying Principle

Figure 3:
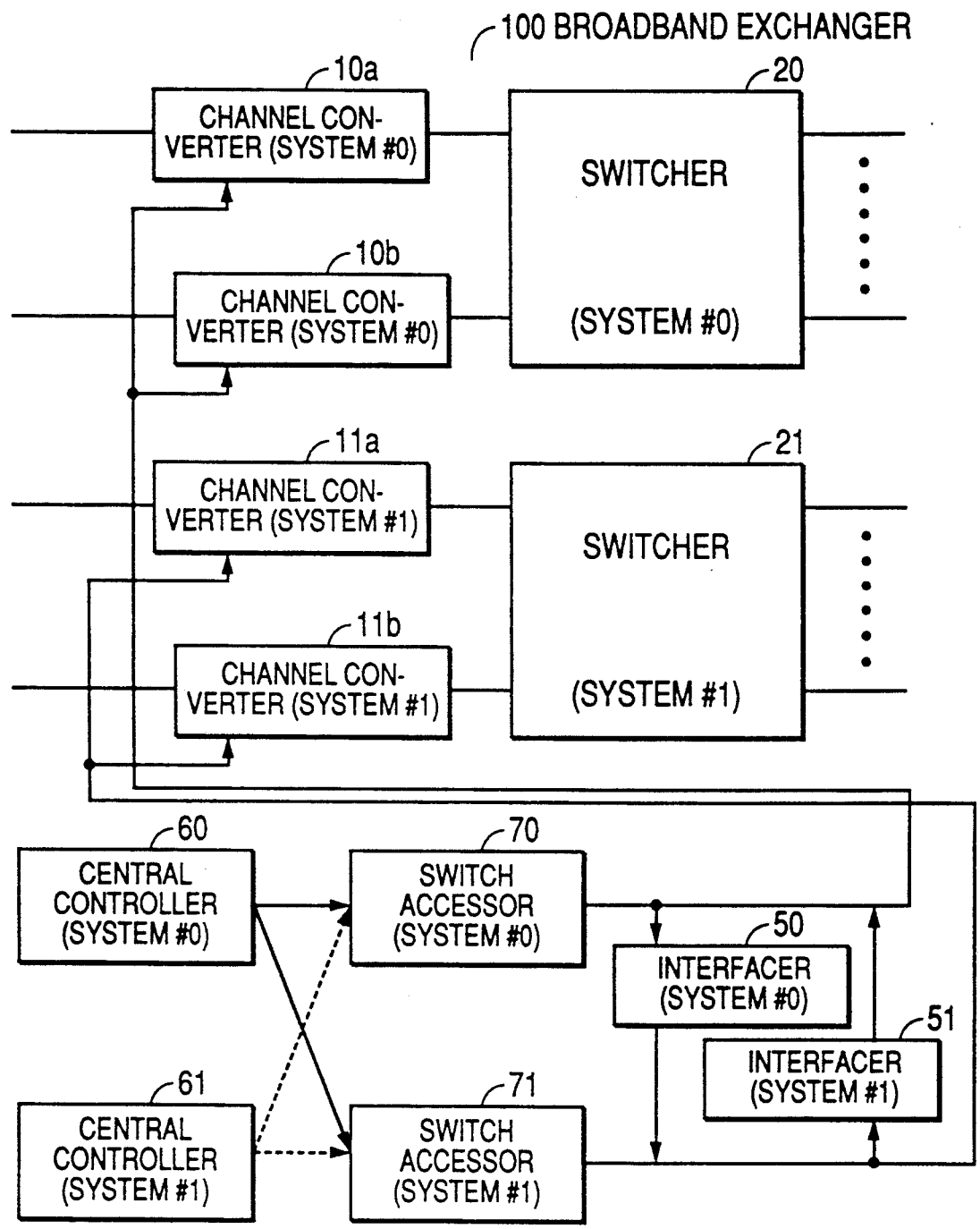
FIG. 3 is a block diagram of a broadband exchanger pursuant to this invention.

FIG. 3 is a block diagram of a broadband exchanger pursuant to this invention.

Figure 1:
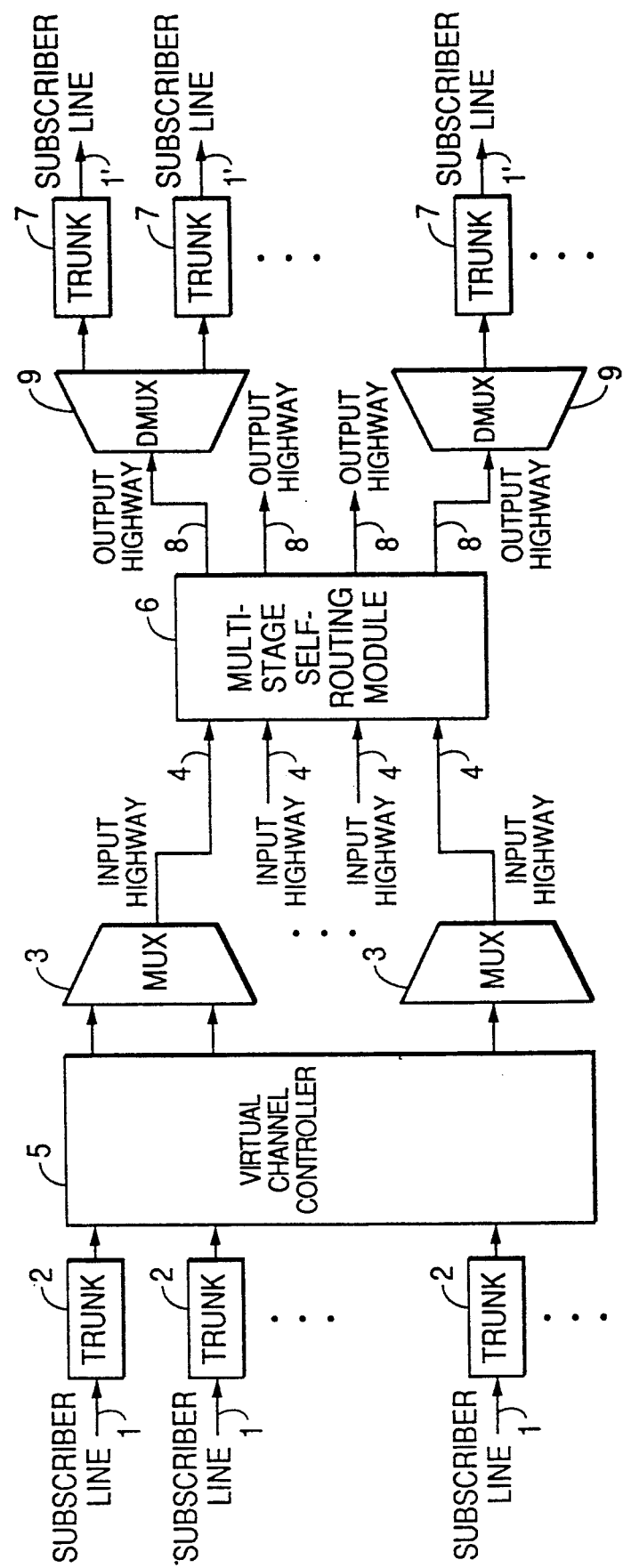
FIG. 1 is a block diagram of a communications route in an ATM exchanger.
Figure 2:
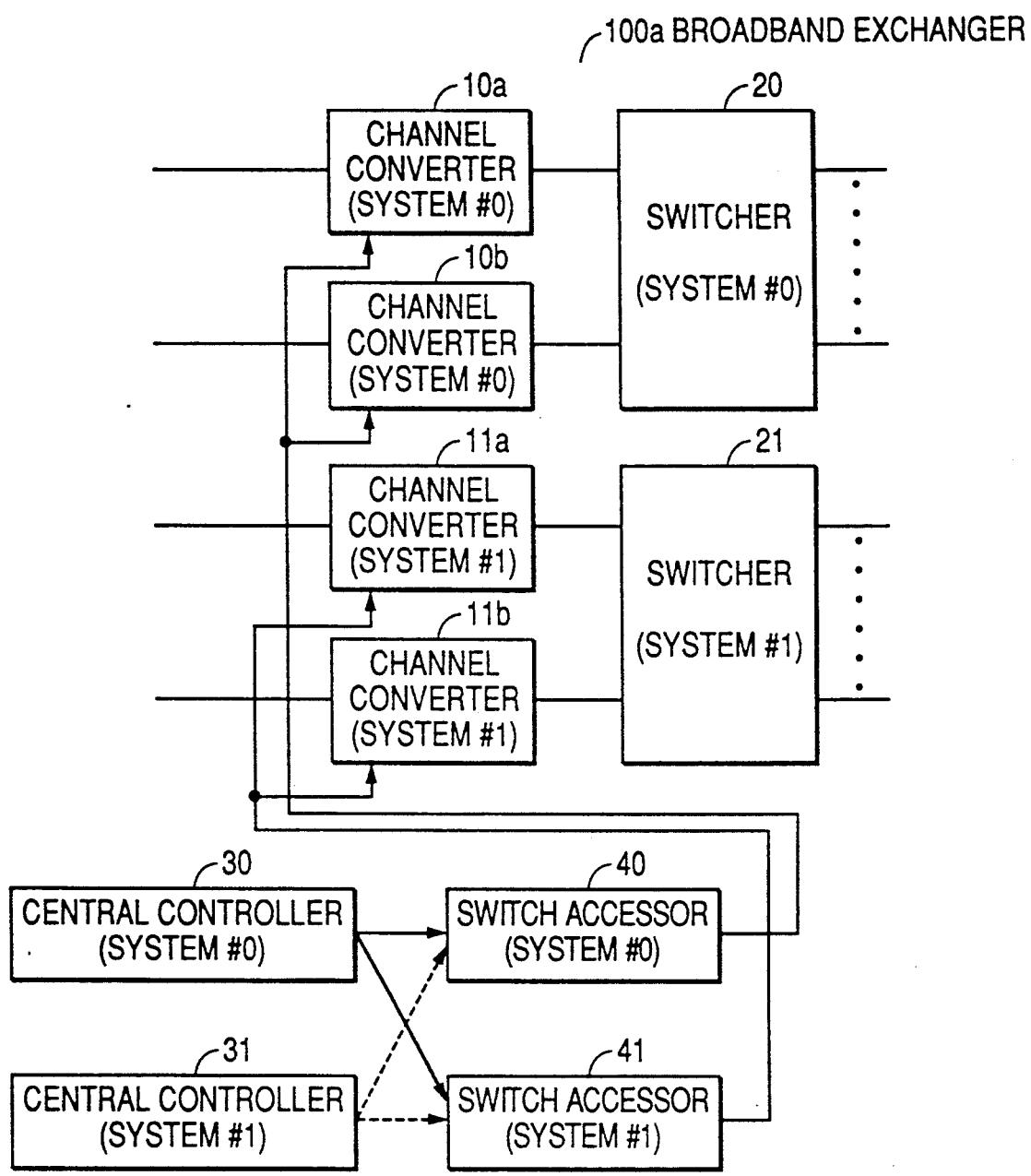
FIG. 2 is a block diagram of a broadband exchanger pursuant to a prior art example.

A broadband exchanger 100 having a dual system structure has a configuration, the necessary changes having been made, resembling that of broadband exchanger 100A shown in FIG. 2. Parts shown in FIG. 3, which are the same as those shown in FIG. 2, have the same numbers. As with the parts shown in FIG. 2, numbers are assigned to the parts shown in FIG. 3, such that the parts numbered zero [0] at the least significant bit are for system #0 in active use and the parts numbered one [1] at the least significant bit are for system #1 in reserve.

The channel converters 10a, ... and 10b and 11a, ... and 11b give channel setting information for routing cells inputted from lines and comprise tables for storing channel setting information. Switchers 20 and 21 form paths designated by channel setting information set by the channel converters 10a, ... and 10b and 11a, ... and 11b.

Interfacers 50 and 51 mutually write respective channel setting information stored in the tables of channel converters 10a, ... and 10b and 11a, ... and 11b. More specifically, interfacer 50 writes channel setting information stored in the tables of channel converters 10a, ... and 10b to the corresponding tables of channel converters 11a, ... and 11b, and interfacer 51 writes channel setting information stored in the tables of channel converters 11a, ... and 11b to the corresponding tables of channel converters 10a, ... and 10b.

Central controllers 60 and 61 execute switching processes. Switch accessors 70 and 71 exchange control information between the channel converters 10a, ... and 10b and 11a, ... and 11b and the central controllers 60 and 61.

When switcher 21 of system #1 in reserve is booted up from an out-of-service status to an in-service status, switch accessor 70 of system #0 in active use reads channel setting information stored in the tables of channel converters 10a, ... and 10b and writes it in interfacer 50, and switch accessor 71 of system #1 in reserve reads channel setting information stored in interfacer 50 and writes it in the tables of channel converters 11a, ... and 11b. Thus, the channel setting information stored in the tables of channel converters 10a, ... and 10b are copied as the channel setting information stored in the tables of channel converters 11a, ... and 11b, thereby forming the same paths in switcher 21 of system #1 in reserve as those formed in switcher 20 of system #0 in active use.

For instance, system #0 in active use comprises channel converters 10a, ... and 10b, switcher 20, interfacer 50, central controller 60 and switch accessor 70, and system #1 in reserve comprises channel converters 11a, ... and 11b, switcher 21, interfacer 51, central controller 61 and switch accessor 71.

Broadband exchanger 100 is structured by an MSSR (multistage self-routing) system, whereby channel converters 10a, ... and 10b attach to cells inflowing from lines their routing information on the paths within switcher 20 through which they pass. More specifically, one of channel converters 10a, ... and 10b in the input state of switcher 20 alone determines all the switching information. Although system #0 in active use has been explained, the operations are the same for system #1 in reserve.

When system #1 in reserve is booted up from an out-of-service status to an in-service status, the channel setting information stored in the tables of channel converters 10a, ... and 10b are copied to the tables of channel converters 11a, ... and 11b through interfacer 50 under control of switch accessor 70 and not under control of central controller 60 such as its software processing. Thus, system is activated to become an active system which sets paths in switcher 21 according to the contents in the copied tables in channel converters 11a, ... and 11b. That is, a copying by hardware alone enables an INS processing to be executed.

Interfacer 50 is used for copying the tables of channel converters 10a, ... and 10b of system #0 to the tables of channel converters 11a, ... and 11b of system #1. Interfacer 51 is used for copying the tables of channel converters 11a, ... and 11b of system #1 to the tables of channel converters 10a, ... and 10b of system #0.

A single dual-port RAM, for instance, may be used in lieu of the interfacers 50 and 51, for its random access ability to bi-directionally write to and read from both systems #0 and #1.

Figure 4B:
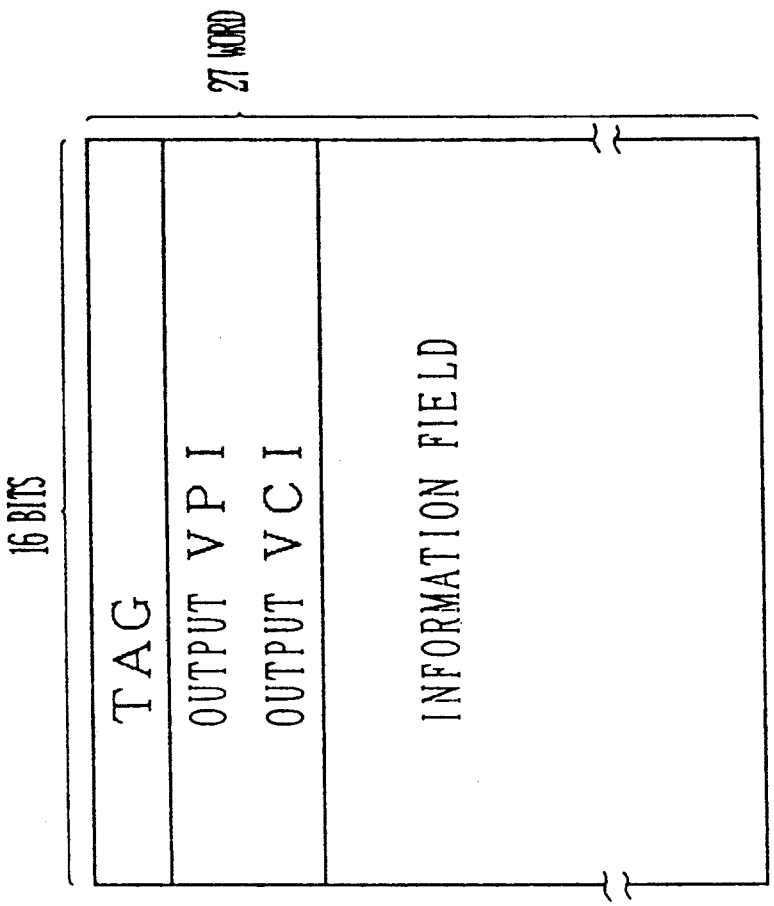
FIGS. 4A and 4B explain cell formats.
Figure 4A:
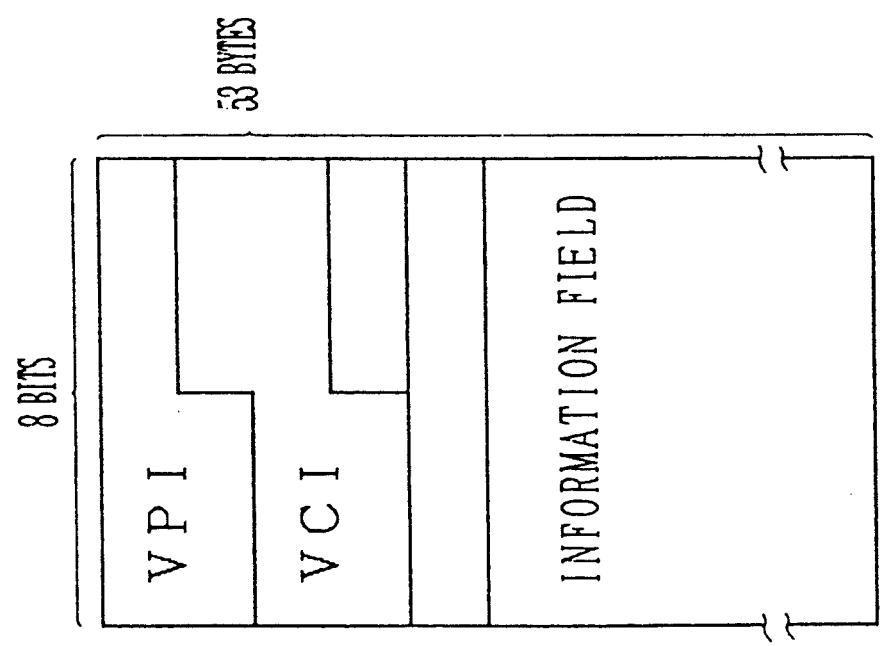

FIGS. 4A and 4B explain cell formats.

More specifically, FIG. 4A shows the cell format of an incoming cell inputted to and an outgoing cell outputted from the channel converters 10a, ... and 10b and 11a, ... and 11b, and FIG. 4B shows the cell format of an internal cell flowing in the MSSR 6.

As shown in FIG. 4A, an incoming cell and an outgoing cell each comprises fifty-three [53] bytes of data paralleled in eight [8] bits. An incoming call or an outgoing cell comprises a header, reserve bits and an information field. The header at the head end has a virtual path identifier (VPI) for selecting a path on its transmission route and a virtual channel identifier (VCI) for identifying the cell type and the cell originator. The information field carries payload communications data.

The channel converters 10a, ... and 10b and 11a, ... and 11b convert the cell format from that of an incoming cell to that of an internal cell.

As shown in FIG. 4B, an internal cell comprises twenty-seven [27] words of data paralleled in sixteen [16] bits. An internal cell comprises a tag, an output VPI paired with an output VCI, and an information field. The channel converters 10a, ... and 10b and 11a, ... and 11b attach to the head end of an incoming cell a tag for routing the cell within the switchers 20 and 21. They also rewrite the VCI and VPI to an output VPI and VCI by referring to software.

Figure 5:
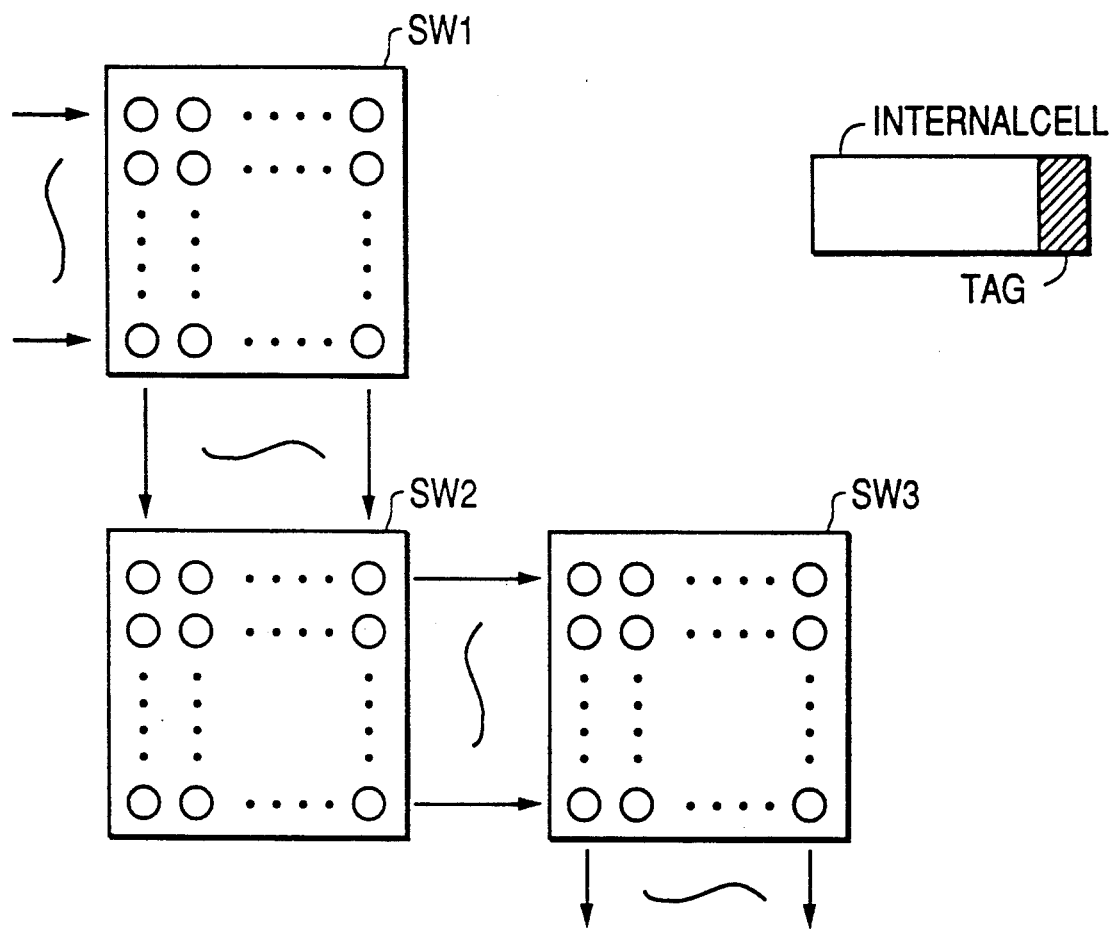
FIG. 5 illustrates exemplary MSSR switchers.

FIG. 5 illustrates exemplary MSSR switchers.

More specifically, FIG. 5 shows a case in which the MSSR 6 comprises three [3] eight-by-eight [8×8] switchers SW1, SW2 and SW3.

A circle sign indicates a buffer memory. Data written into the memory buffer at the position specified by the tag of an incoming cell are read out by clock signals on the output line side.

A broadband exchanger for exchanging cells uses an ATM communications route such as an MSSR comprising switchers.

The channel converters 10a, ... and 10b and 11a, ... and 11b at the reception of trunks 2 obtain, from the VPI and VCI stored in the header of an incoming cell, the tag giving information on routing an incoming cell within the MSSR 6 to be attached to the head end (in front of the header) of the incoming cell.

Each of the switchers SW1, SW2 and SW3 of the MSSR 6 forming a communications route judges whether or not it should switch an incoming cell according to the tag attached to the head end of the incoming cell supplied from an input line. On judging it should switch an incoming cell, it multiplexes the incoming cell on an empty time slot on an output line. At this time, hardware autonomously performs the above judgments and switching processes at each cross point comprising a memory buffer.

Depiction of the Substantive Examples

Figure 6:
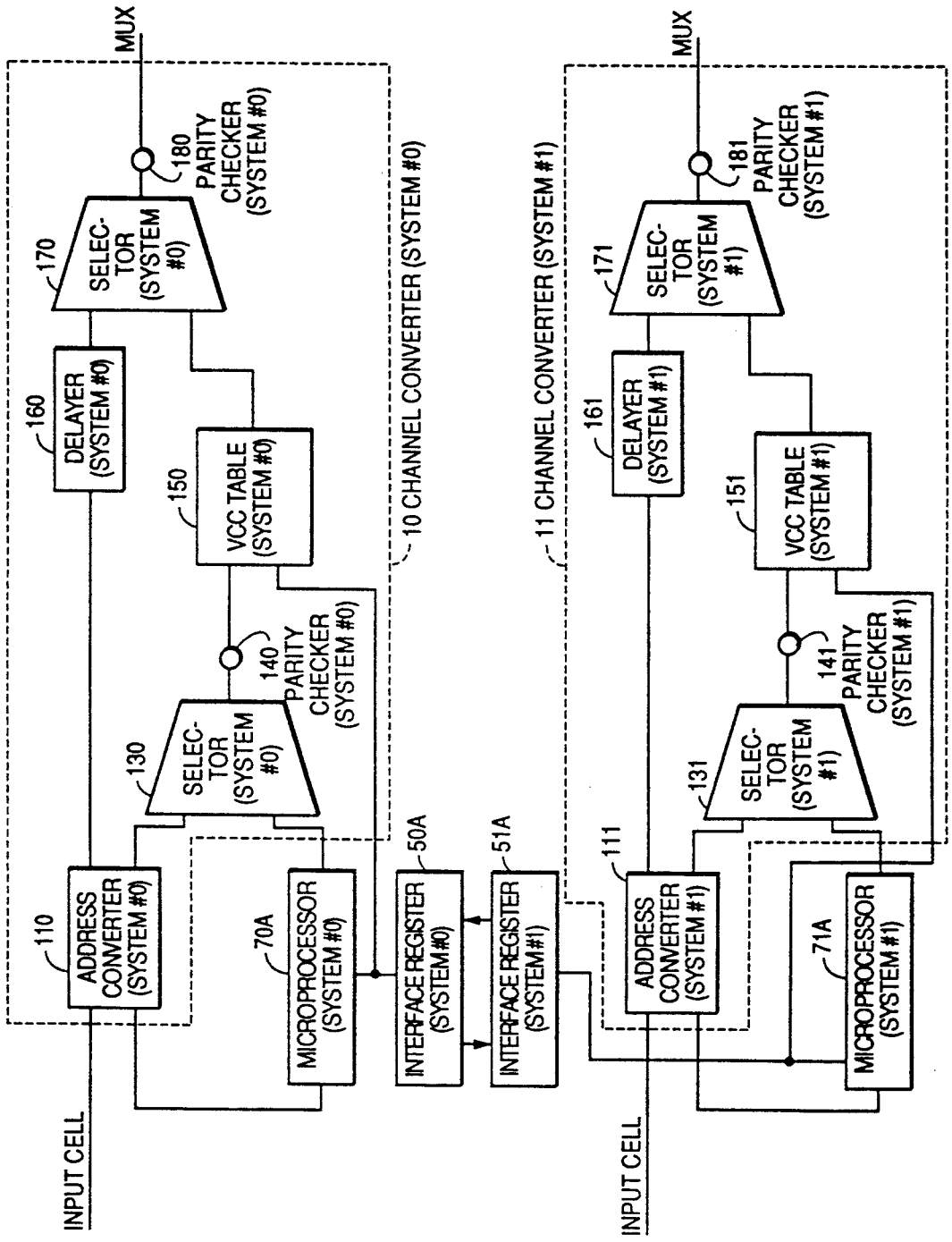
FIG. 6 is a block diagram of a broadband exchanger pursuant to a first embodiment.

FIG. 6 is a block diagram of a broadband exchanger pursuant to a first embodiment.

A virtual channel converter (VCC) 10 corresponds to one or more of channel converters 10a, ... and 10b shown in FIG. 3. VCC 10 comprises an address converter 110, selectors 130 and 170, parity checkers 140 and 180, a VCC table 150 and a delayer 160. An interface register 50A and a microprocessor 70A correspond respectively to interfacer 50 and switch accessor 70 shown in FIG. 3.

A virtual channel converter (VCC) 11 corresponds to one or more of channel converters 11a, ... and 11b shown in FIG. 3. VCC 11 comprises an address converter 111, selectors 131 and 171, parity checkers 141 and 181, a VCC table 151 and a delayer 161. An interface register 51A and a microprocessor 71A correspond respectively to interfacer 51 and switch accessor 71 shown in FIG. 3.

As with the parts shown in FIGS. 2 and 3, numbers are assigned to the parts shown in FIG. 6, such that the parts numbered zero [0] at the least significant bit are for system #0 in active use and the parts numbered one [1] at the least significant bit are for system #1 in reserve. System #1 in reserve configures a mirror image of system #0 in active use.

Address converter 110 outputs through selector 130 to VCC table 150 an address in VCC table 150, corresponding to the VPI and VCI of an incoming cell, preassigned under control of microprocessor 70A.

VCC table 150 matches the address with data stored in central controller 60, determines the address part (comprising the tag and the output VPI and the output VCI) of an outgoing cell, and writes them in the outgoing cell for its output through selector 170 and in itself. The tag specifies an internal switching path within the MSSR 6. Delayer 160 synchronizes the delay of the information field passing the upper artery (from address converter 110 through delayer 160 to parity checker 180) and the delay of the address part passing the lower artery (from address converter 110 through selector 130, parity checker 140 and VCC table 150 to parity checker 180). Parity checkers 140 and 180 are for checking the parity.

Microprocessor 70A controls VCC table 150 and analyzes commands received from central controller 60.

The above description relating to system #0 can be applied, the necessary changes having been made, to system #1.

The following description assumes that system #0 in active use is in an in-service status and that system #1 in reserve is in an out-of-service status.

When system #1 in reserve is in an out-of-service status, VCC table 151 stores nothing and no path is set in switcher 21 connected to VCC 11.

To activate system #1 in reserve from an out-of-service status to an in-service status, central controller 60 specifies a command invoking an INS processing.

Microprocessor 70A of system #0 in active use writes the contents of VCC table 150 to interface register 50A, on receiving the command invoking the INS processing. Microprocessor 71A of system #1 in reserve stores, in VCC table 151 in VCC 11 of system #1 in reserve, the content of interface register 50A read through interface register 51A, on receiving the command invoking the INS processing. That is, VCC table 151 copies the content of VCC table 150. When VCC 10 normally consummates the copying, microprocessor 71A of system #1 in reserve notifies microprocessor 70A of system #0 in active use of the effect. System #0 in active use emits an INS processing consummation notice to MSCN (maintenance signal scan). Central controller 60 invokes a regular SCAN after a predetermined period of time and recognizes the INS processing consummation.

The microprocessors 70A and 71A execute those operations from the beginning without interacting with central controller 60, except that it specifies the command invoking the INS processing, thereby freeing up a part of its computing capacity.

Figure 7:
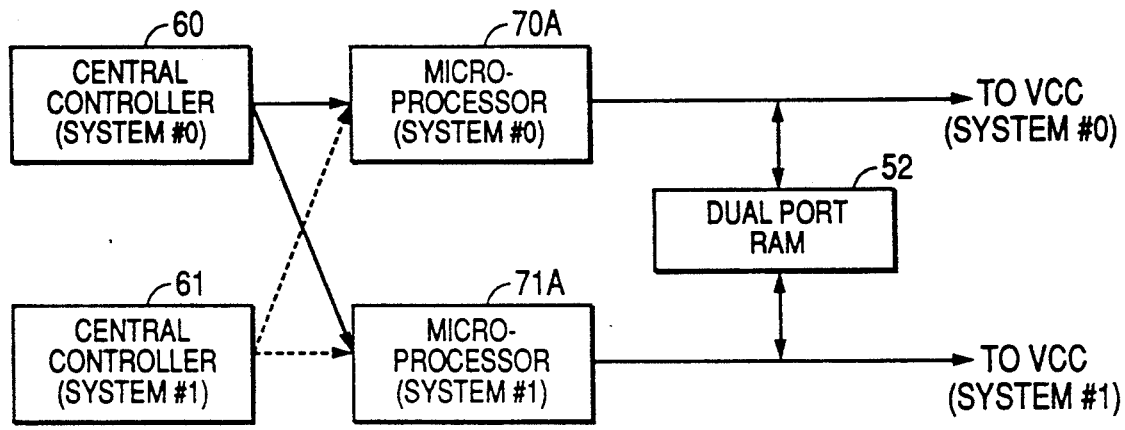
FIG. 7 is a block diagram of a broadband exchanger pursuant to a second embodiment.

FIG. 7 is a block diagram of a broadband exchanger pursuant to a second embodiment.

The second embodiment shown in FIG. 7 employs a single dual-port RAM 52 in lieu of the interface registers 50A and 51A employed in the first embodiment shown in FIG. 6. The single dual-port RAM 52 has a random access ability to be bi-directionally written to and read from both microprocessor 70A of system #0 and microprocessor 71A of system #1.

Figure 8:
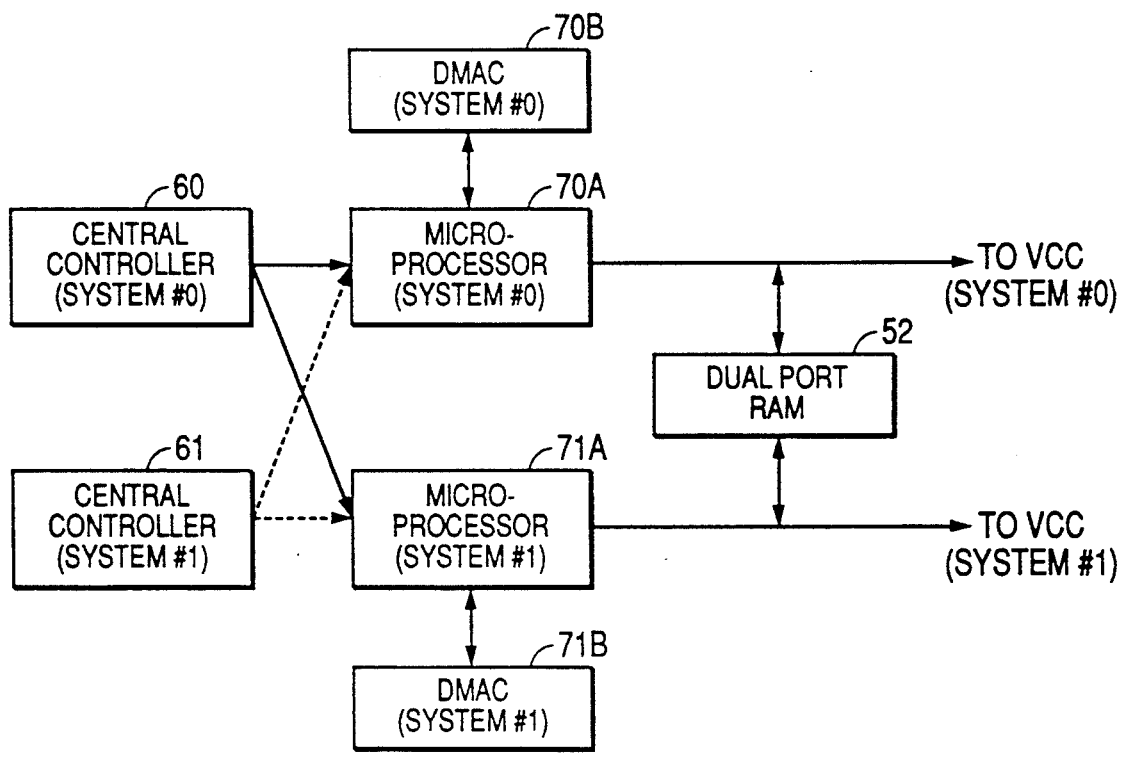
FIG. 8 is a block diagram of a broadband exchanger pursuant to a third embodiment.

FIG. 8 is a block diagram of a broadband exchanger pursuant to a third embodiment.

The third embodiment shown in FIG. 8 further employs a direct memory access controller (DMAC) 70B for system #0 and a direct memory access controller (DMAC) 71B for system #1. Independently of the microprocessors 70A and 71A, the DMACs 70B and 71B control high-speed copying of the contents of the VCC tables 150 and 151 to each other during executions of INS processings.

Because the hardware autonomously performs an INS processing for booting up a standby system from an out-of-service status to an in-service status by copying to its VCC tables the contents of corresponding VCC tables of an active system, an INS (in-service) processing for activating the standby system of a broadband exchanger having a dual system structure realized by this invention has an advantage of reducing a software load on a central controller and fast executing an INS processing.

Although the first, second and third embodiments describe cases in which system #0 is the active system and system #1 is the standby system in a dual system structure, it goes without saying they can be interchanged vice versa.

Although the first, second and third embodiments describe cases in which the standby system in a dual system structure are booted up, this invention can be applied, the necessary changes having been made, to booting up a standby system in a triplex, quadruplex, quintuplex or any other multiplex system structure.

Although the first, second and third embodiments describe cases in which a broadband exchanger of an ATM transmission system transmits and exchanges ATM cells transporting data in different bands, this invention can be applied analogously to a broadband exchanger of an STM (synchronous transfer mode) transmission system having a dual system structure.

What is claimed is:

1. An in-service activator for a broadband exchanger, comprising:
    a dual pair of systems comprising a first system and a second system, wherein one of the first and second systems is an active system and the other system is a to-be-activated standby system and wherein each system comprises:
        channel converter means, in which channel setting information is stored, for receiving a cell from an input line, storing in the cell channel setting information and transmitting the cell containing the channel setting information, and
        switcher means for receiving the cell from the channel converter means analyzing the channel setting information and switching path of the cell based on the channel setting information; and
    interfacer means for storing, in the channel converter means of the to-be-activated standby system of the dual pair, the channel setting information read from the corresponding channel converter means of the active system of the dual pair.

2. The in-service activator for a broadband exchanger as set forth in claim 1, wherein the interfacer means further comprises:
    a first interfacing circuit storing, in the channel converter means of the second system of the dual pair, the channel setting information read from the corresponding channel converter means of the first system of the dual pair when the second system is the to-be-activated standby system; and
    a second interfacing circuit storing, in the channel converter means of the first system of the dual pair, the channel setting information read from the corresponding channel converter means of the second system of the dual pair when the first system is the to-be-activated standby system.

3. The in-service activator for a broadband exchanger as set forth in claim 1, wherein:
    the interfacer means comprises a dual-port RAM having a first port and a second port, wherein
        the first port receives first channel setting information read from the channel converter means of the first system of the dual pair which is stored in the dual-port RAM, and
        the corresponding channel converter means of the second system of the dual pair stores the first channel setting information read from the first port in the second system, and wherein the second port receives second channel setting information read from the channel converter means of the second system of the dual pair which is stored in the dual-port RAM, and the corresponding channel converter means of the first system of the dual pair stores the second channel setting information read from the second port in the first system.

4. The in-service activator for a broadband exchanger as set forth in claim 3, wherein the interfacer means further comprises:

a first direct memory access controller means, connected to a bus of the first processor, for accessing the first port; and a second direct memory access controller means, connected to a bus of the second processor, for accessing the second port.

5. An in-service activator for a broadband exchanger, comprising:

a dual pair of systems comprising a first system and a second system, wherein one of the first and second systems is an active system and the other system is a to-be-activated standby system and wherein each system comprises:

channel converter means, in which channel setting information is stored, for receiving a cell from an input line, storing in the cell channel setting information and transmitting the cell containing the channel setting information, and switcher means for receiving the cell from the channel converter means analyzing the channel setting information and switching path of the cell based on the channel setting information; and interfacer means for storing, in the channel converter means of the to-be-activated standby system of the dual pair, the channel setting information read from the corresponding channel converter means of the active system of the dual pair;

a first processor controlled by the interfacer means to read the channel setting information from the channel converter means of the first system and to store in the channel converter means of the second system the channel setting information read from the corresponding channel converter means of the first system; and a second processor controlled by the interfacer means to read the channel setting information from the channel converter means of the second system and to store in the channel converter means of the first system the channel setting information read from the corresponding channel converter means of the second system.

6. The in-service activator for a broadband exchanger as set forth in claim 5, wherein the interfacer means further comprises:

a first interfacing circuit storing, in the channel converter means of the second system of the dual pair, the channel setting information read from the corresponding channel converter means of the first system of the dual pair when the second system is the to-be-activated standby system; and a second interfacing circuit storing, in the channel converter means of the first system of the dual pair, the channel setting information read from the corresponding channel converter means of the second system of the dual pair when the first system is the to-be-activated standby system.

7. An in-service activator for a broadband exchanger comprising:

a dual pair of systems comprising a first system and a second system, wherein one of the first and second systems is an active system and the other system is a to-be-activated standby system and wherein each system comprises:

channel converter means, in which channel setting information is stored, for receiving a cell from an input line, storing in the cell channel setting information and transmitting the cell containing the channel setting information, and switcher means for receiving the cell from the channel converter means analyzing the channel setting information and switching path of the cell based on the channel setting information; and interfacer means for storing, in the channel converter means of the to-be-activated standby system of the dual pair, the channel setting information read from the corresponding channel converter means of the active system of the dual pair;

a first processor controlled by the interfacer means to read the channel setting information from the channel converter means of the first system and to store in the channel converter means of the second system the channel setting information read from the corresponding channel converter means of the first system; and a second processor, controlled by the interfacer means, to read the channel setting information from the channel converter means of the second system and to store in the channel converter means of the first system the channel setting information read from the corresponding channel converter means of the second system; and the interfacer means comprises a dual-port RAM having a first port and a second port, wherein the first port receives first channel setting information read from the channel converter means of the first system of the dual pair which is stored in the dual port RAM under control of the first processor, and the corresponding channel converter means of the second system of the dual pair stores the first channel setting information read from the first port under control of the second processor, and wherein the second port receives second channel setting information read from the channel converter means of the second system of the dual pair which is stored in the dual-port RAM under control of the second processor, and the corresponding channel converter means of the first system of the dual pair stores the second channel setting information read from the second port under control of the first processor.

8. The in-service activator for a broadband exchanger as set forth in claim 7, wherein the interfacer means further comprises:

a first direct memory access controller means, connected to a bus of the first processor, for accessing the first port; and a second direct memory access controller means, connected to a bus of the second processor, for accessing the second port.

9. An in-service activator for a broadband exchanger, comprising:

a plurality of systems, wherein at least one system is an active system and at least one system is a to-be-activated standby system, each system comprising:

channel converter means, in which channel setting information is stored, receiving a cell from an input line, storing in the cell channel setting information and transmitting the cell containing the channel setting information, and means for receiving the cell from the channel converter means, analyzing the channel setting information and switching path of the cell based on the channel setting information; and an interfacer means for storing, in the channel converter means of the to-be-activated standby system, the channel setting information read from the corresponding channel converter means of the active system.

10. An in-service activator for a broadband exchanger comprising:

two systems each comprising:

channel converting means for applying, to a cell, channel setting information indicating a switch through which said cell passes among a plurality of switches forming a switch unit provided in said broadband exchanger, outputting said cell to said switch unit, and storing said information, and switching means for switching said cell outputted by said channel converting means; and interfacing means for reading said channel setting information which is stored in said channel converting means of one system when it is in an active state, and copying and storing said information in another system if another system turns from a standby state to the active state.

11. An in-service activator for a broadband exchanger comprising:

two systems each comprising:

channel converting means for applying, to a cell, channel setting information indicating through which switch said cell passes among a plurality of switches forming a switch unit provided in said broadband exchanger, outputting said cell to said switch unit, and storing said information, and switching means for switching said cell outputted by said channel converting means;

interfacing means for reading said channel setting information which is stored in said channel converting means of one system when it is in an active state, and copying and storing said information in another system if another system turns from a standby state to the active state; and first and second processors for controlling reading and storing operations performed by said interfacing means so as to copy said information.

12. An in-service activator for a broadband exchanger comprising:

two systems each comprising:

channel converting means for applying, to a cell, channel setting information indicating through which switch said cell passes among a plurality of switches forming a switch unit provided in said broadband exchanger, outputting said cell to said switch unit, and storing said information, and switching means for switching said cell outputted by said channel converting means;

interfacing means for reading said channel setting information which is stored in said channel converting means of one system when it is in an active state, and copying and storing said information in another system if another system turns from a standby state to the active state; and first and second processors for controlling reading and storing operations performed by said interfacing means so as to copy said information, wherein said interfacing means is a dual port RAM having first and second ports, writes channel setting information read under the control of said first processor to said first dual port RAM, reads said information under the control of said second processor, stores said information in one channel converting means, reads said information read under the control of said second processor to said second dual port RAM, reads said information under the control of said first processor, and stores said information in another channel converting means.

* * * * *

UNITED STATES PATENT AND TRADEMARK OFFICE
CERTIFICATE OF CORRECTION

PATENT NO. : 5,295,134
DATED : March 15, 1994
INVENTOR(S) : Shuji Yoshimura et al.

It is certified that error appears in the above-indentified patent and that said Letters Patent is hereby corrected as shown below:

Col. 1, line 14, the "," should be a --.--;

line 15, "communication" should be --Communication--; and line 34, after "subscriber" insert a --,--.

Col. 5, line 25, after "system" insert --#1--; and line 26, after "system" insert a --,--.

Signed and Sealed this

Eighteenth Day of October, 1994

Attest:

BRUCE LEHMAN

*Attesting Officer*  *Commissioner of Patents and Trademarks*